United States Patent
Yamawaki et al.

(10) Patent No.: US 10,612,642 B2
(45) Date of Patent: Apr. 7, 2020

(54) METHOD FOR MANUFACTURING RACK AND HOLLOW RACK BAR

(71) Applicant: NETUREN CO., LTD., Tokyo (JP)

(72) Inventors: Takashi Yamawaki, Tokyo (JP); Ryosuke Suzuki, Tokyo (JP); Kenichi Aoki, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 62 days.

(21) Appl. No.: 15/948,116

(22) Filed: Apr. 9, 2018

(65) Prior Publication Data

US 2018/0223981 A1    Aug. 9, 2018

Related U.S. Application Data

(62) Division of application No. 14/895,123, filed as application No. PCT/JP2014/065024 on May 30, 2014, now abandoned.

(30) Foreign Application Priority Data

Jun. 3, 2013   (JP) ................................ 2013-117096

(51) Int. Cl.
     *B23K 20/12*      (2006.01)
     *F16H 55/26*      (2006.01)
     (Continued)

(52) U.S. Cl.
     CPC ............ *F16H 55/26* (2013.01); *B23K 20/12* (2013.01); *B23K 20/1205* (2013.01);
     (Continued)

(58) Field of Classification Search
     CPC ... F16H 55/26; B23K 20/129; B23K 20/1205; B23K 37/0443; B23K 2103/04;
     (Continued)

(56) References Cited

U.S. PATENT DOCUMENTS 3,337,108 A * 8/1967 Taylor .................. B23K 20/121
                                                         228/2.3
3,377,009 A * 4/1968 Lipp ...................... B23K 20/12
                                                         228/2.3
(Continued)

FOREIGN PATENT DOCUMENTS

EP      2 082 818      7/2009
JP      42-87      1/1967
(Continued)

OTHER PUBLICATIONS

International Search Report dated Aug. 26, 2014 in International Application No. PCT/JP2014/065024.
(Continued)

*Primary Examiner* — Kiley S Stoner
(74) *Attorney, Agent, or Firm* — Wenderoth, Lind & Ponack, L.L.P.

(57) ABSTRACT

A method of fabricating a rack, the method includes: supporting a first rack bar having a first toothed part on a shaft of the first rack bar; supporting a second rack bar having a second toothed part on a shaft of the second rack bar such that an axial center line of the second rack bar coincides with an axial center line of the first rack bar; supporting a joint member between the first and second rack bars such that an axial center line of the joint member coincides with the axial center lines of the first and second rack bars; rotating the joint member about the axial center lines of the first and second rack bars relative to the first and second rack bars; and bringing an end of the first rack bar and an end of the second rack bar into friction pressure welding with the joint member.

8 Claims, 11 Drawing Sheets

(51) Int. Cl.
*B23K 37/04* (2006.01)
*B23K 103/04* (2006.01)

(52) U.S. Cl.
CPC ........ *B23K 20/129* (2013.01); *B23K 37/0443*
(2013.01); *B23K 2103/04* (2018.08)

(58) Field of Classification Search
CPC ...... B23K 2101/28; B23K 2101/04–08; B23K 20/12–1215
USPC .............................. 228/112.1–114.5, 2.1–2.3
See application file for complete search history.

(56) References Cited

U.S. PATENT DOCUMENTS

| | | | | |
|---|---|---|---|---|
| 3,472,996 A | * | 10/1969 | Braid | B23K 20/129 219/104 |
| 3,580,459 A | * | 5/1971 | Gage | B23K 20/12 228/2.3 |
| 3,609,854 A | * | 10/1971 | Hasui | B23K 20/12 228/114 |
| 3,717,295 A | * | 2/1973 | Woodall | B23K 20/12 228/2.3 |
| 3,779,446 A | * | 12/1973 | Lemelson | B23K 5/08 228/15.1 |
| 3,838,807 A | * | 10/1974 | Nomura | B23K 20/12 228/2.3 |
| 3,897,896 A | * | 8/1975 | Louw | B23K 20/12 228/2.3 |
| 3,954,215 A | * | 5/1976 | Takagi | B23K 20/121 228/2.3 |
| 4,043,497 A | * | 8/1977 | Jones | B23K 20/12 228/2.3 |
| 4,193,722 A | * | 3/1980 | Bishop | B23F 15/00 409/268 |
| 4,605,151 A | * | 8/1986 | Brown | B23K 37/053 228/2.3 |
| 5,858,142 A | * | 1/1999 | Tully | B23K 20/121 156/580 |
| 6,706,127 B1 | * | 3/2004 | Duggirala | B23P 15/00 148/570 |
| 6,925,899 B2 | * | 8/2005 | Ozeki | B21K 1/767 74/109 |
| 7,168,282 B2 | | 1/2007 | McLean | |
| 7,654,165 B2 | | 2/2010 | Roeske | |
| 7,721,617 B2 | | 5/2010 | Fukumura | |
| 7,887,069 B2 | | 2/2011 | Bilmayer | |
| 9,139,221 B2 | | 9/2015 | Takai | |
| 9,199,662 B2 | * | 12/2015 | Ueno | B62D 3/12 |
| 9,884,388 B2 | * | 2/2018 | Sweeting | B23K 37/04 |
| 2002/0026845 A1 | * | 3/2002 | Tsubouchi | B21K 1/767 74/457 |
| 2002/0073793 A1 | | 6/2002 | Tsubouchi et al. | |
| 2003/0097894 A1 | | 5/2003 | Ozeki | |
| 2003/0213321 A1 | | 11/2003 | Tsubouchi et al. | |
| 2004/0182125 A1 | | 9/2004 | McLean | |
| 2004/0256439 A1 | * | 12/2004 | Pfeiler | B23K 20/12 228/112.1 |
| 2005/0255927 A1 | | 11/2005 | Michioka | |
| 2005/0257992 A1 | | 11/2005 | Shiino | |
| 2006/0016238 A1 | * | 1/2006 | Shiokawa | B21D 17/02 72/370.21 |
| 2006/0113358 A1 | * | 6/2006 | Crasser | B23K 20/1205 228/112.1 |
| 2006/0278466 A1 | | 12/2006 | Cheng | |
| 2007/0051776 A1 | * | 3/2007 | Estes | B23K 20/129 228/101 |
| 2007/0057479 A1 | * | 3/2007 | Wolf | B62D 3/126 280/93.514 |
| 2007/0137343 A1 | * | 6/2007 | Roeske | B21J 5/12 74/424.6 |
| 2008/0127762 A1 | | 6/2008 | Baxter | |
| 2009/0200356 A1 | * | 8/2009 | Kawaura | B23K 20/12 228/2.3 |
| 2009/0242613 A1 | * | 10/2009 | Kawaura | B23K 13/015 228/114.5 |
| 2009/0260467 A1 | * | 10/2009 | Kobayashi | B21D 15/04 74/422 |
| 2010/0038167 A1 | | 2/2010 | Bilmayer et al. | |
| 2010/0052280 A1 | | 3/2010 | Bilmayer | |
| 2010/0162843 A1 | | 7/2010 | Kobayashi et al. | |
| 2010/0206861 A1 | * | 8/2010 | Rudolph | B23K 20/121 219/137 R |
| 2012/0160595 A1 | * | 6/2012 | Fujitomi | B62D 3/12 180/443 |
| 2012/0186085 A1 | | 7/2012 | Kobayashi et al. | |
| 2012/0258329 A1 | * | 10/2012 | Tanabe | B21K 25/00 428/600 |
| 2014/0060956 A1 | | 3/2014 | Takai | |
| 2015/0136304 A1 | * | 5/2015 | Onose | B23Q 15/02 156/64 |
| 2016/0023300 A1 | * | 1/2016 | Kimura | B23K 20/12 492/1 |
| 2016/0083823 A1 | * | 3/2016 | Horikami | C22C 38/001 74/422 |
| 2018/0031104 A1 | * | 2/2018 | Yamawaki | B23P 15/14 |
| 2018/0304422 A1 | * | 10/2018 | Nomura | B62D 3/126 |
| 2018/0306303 A1 | * | 10/2018 | Inagaki | B62D 3/126 |

FOREIGN PATENT DOCUMENTS

| | | |
|---|---|---|
| JP | 47-41662 | 10/1972 |
| JP | 62-168260 | 10/1987 |
| JP | 2002-154442 | 5/2002 |
| JP | 2002-178094 | 6/2002 |
| JP | 2002-224856 | 8/2002 |
| JP | 2004-523365 | 8/2004 |
| JP | 3772110 | 5/2006 |
| JP | 2008-137497 | 6/2008 |
| JP | 2009-734 | 1/2009 |
| JP | 2013-13904 | 1/2013 |
| WO | 02/076653 | 10/2002 |

OTHER PUBLICATIONS

Office Action dated Jan. 27, 2017 in Japanese Patent Application No. 2013-117096 (with English translation).

\* cited by examiner

METHOD FOR MANUFACTURING RACK AND HOLLOW RACK BAR

CROSS-REFERENCE TO RELATED APPLICATION

This application is based on Japanese Patent Application No. 2013-117096 filed on Jun. 3, 2013, the entire content of which is incorporated herein by reference.

TECHNICAL FIELD

The present invention relates to a method of forming a rack to fabricate a rack bar used for a steering device for a vehicle and a rack bar having the rack, which method is adapted particularly to an electric power steering device, in which a steering wheel is steered by a slide motion of a rack shaft to be geared with a steering pinion connected to the steering side and at the same time, the output of a motor to be controlled by steering torque is transmitted to an auxiliary pinion which is spaced apart from the steering pinion and is geared with the rack shaft, thereby accessorily supporting the steering operation.

BACKGROUND ART

An electric power steering device has been known to include a double-type mechanism (referred hereinafter to as a 'double-pinion type') in which two rack and pinions are provided. In the meantime, it is general that the two racks provided at two sites have different rotational phases with respect to the central line of a shaft.

In the rack bar for use in such a double-pinion type, the two-part racks have been formed by the following method. Specifically, a solid rack bar made of a material, such as e.g. JIS S45C carbon steel, is tooth-cut at two sites by a broaching machine. The rotational phases are controlled by numerical control (NC).

In addition, in a case of a hollow rack bar, rotational phases of toothed parts are NC-controlled at the time when flat-crushing machining is carried out. Further, in a case of a frictional press joined rack bar, solid or hollow materials having toothed parts are jointed together by means of frictional press joining (see e.g. JP 3772110 B2).

SUMMARY OF INVENTION

The fabrication method for the rack bar for use in the double-pinion type however has problems as follows: That is, in the case of the solid rack bar, the toothed parts are provided on either axial side of the rack bar, so that machining such as gun drilling or the like cannot be carried out and the whole weight of the rack bar increases as well. In addition, in case of the hollow rack bar, while it is possible to make the rack bar lighter, the rotational phases of the toothed parts can be dislocated during post tooth-formation and annealing processes, even though a difference between the rotational phases of the toothed parts was previously determined at the time when the flat crushing machining was carried out. Further, in the case of the frictional press joined rack bar, two-way taking or drilling is required because of the positioning in a rotational direction. Furthermore, degradation in precision of a position, which occurs due to deviation of rotational direction or centering, is not appropriate to the electric power steering device.

Accordingly, an object of the present invention is to provide a method of forming a rack which is capable of precisely positioning two toothed parts at a specified degree of phase difference, and a hollow rack bar having the rack.

In order to accomplish the object, the present invention provides a method of fabricating a rack and a hollow rack bar having the rack.

In a method of fabricating a rack, the method includes: supporting a first rack bar having a first toothed part on a shaft of the first rack bar; supporting a second rack bar having a second toothed part on a shaft of the second rack bar such that an axial center line of the second rack bar coincides with an axial center line of the first rack bar; supporting a joint member between the first and second rack bars such that an axial center line of the joint member coincides with the axial center lines of the first and second rack bars; rotating the joint member about the axial center lines of the first and second rack bars relative to the first and second rack bars; and simultaneously bringing an end of the first rack bar and an end of the second rack bar into friction pressure welding with the joint member.

A hollow rack bar includes first and second rack bars and a joint member. The first rack bar has a first toothed part on a hollow shaft of the first rack bar. The second rack bar has a second toothed part on a hollow shaft of the second rack bar. An axial center line of the second rack bar coincides with an axial center line of the first rack bar. The joint member is disposed between the first and second rack bars such that an axial center line of the joint member coincides with the axial center lines of the first and second rack bars. One end surface of the joint member is engaged with the first rack bar and the other end surface of the joint member is engaged with the second rack bar.

According to the present invention, it is possible to position two toothed parts at a specified degree of phase difference in high precision (with respect to deviation/bending/inclination or the like of shaft center).

DESCRIPTION OF EMBODIMENTS

Figure 1:
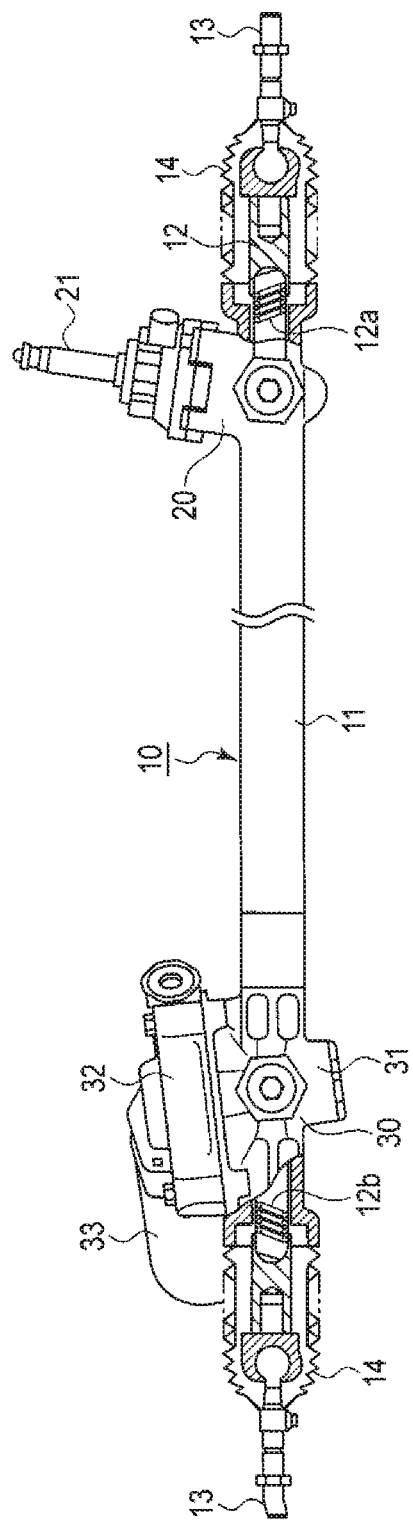
FIG. 1 is a view showing a rack and pinion mechanism having a double-pinion rack bar, which is fabricated by a method of fabricating a rack according to an embodiment of the present invention.
Figure 2:
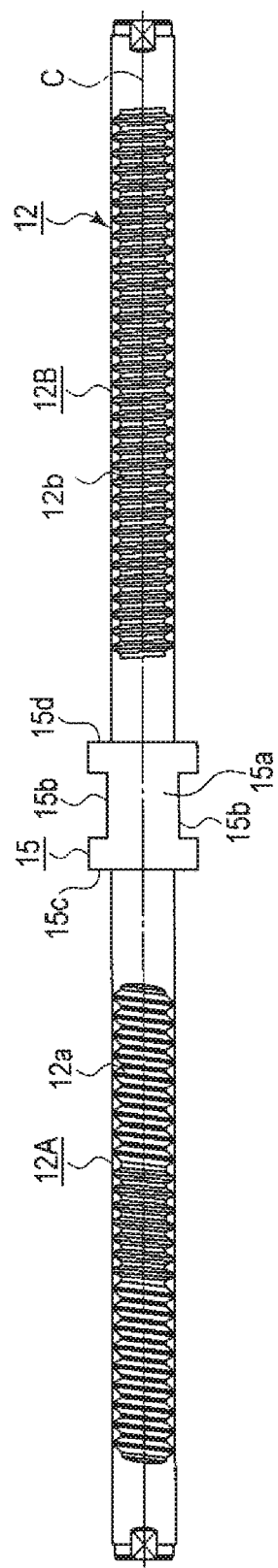
FIG. 2 is a plan view showing the double-pinion rack bar.
Figure 3:
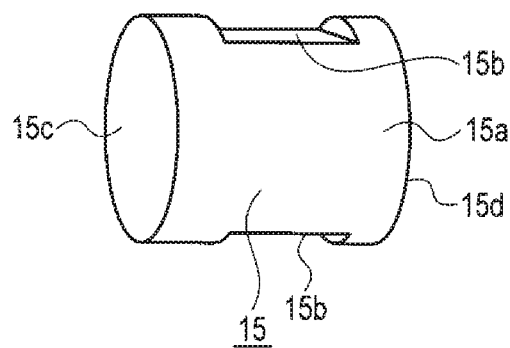
FIG. 3 is a perspective view showing a joint member provided in the double-pinion rack bar.

FIG. 1 is a view showing a rack and pinion mechanism having a double-pinion rack bar 12, which is fabricated by a method of fabricating a rack according to a first embodiment of the present invention, FIG. 2 is a plan view showing the double-pinion rack bar 12, FIG. 3 is a perspective view showing a joint member provided in the double-pinion rack bar 12, and FIGS. 4 to 11 are views showing a procedure of manufacturing the double-pinion rack bar 12.

The rack and pinion mechanism 10 includes a substantially cylindrical rack housing 11 which extends in a transverse direction of a vehicle, and the double-pinion rack bar 12 is accommodated in the rack housing 11 in such a way as to be slidably movable in a transverse axial direction of the rack housing.

The double pinion rack bar 12 extends outwards from opposite end-openings of the rack housing 11, and tie rods 13 and 13 are respectively coupled to both ends of the double pinion rack bar via respective joints, wherein the tie rods 13 and 13 extend laterally from boots 14 and 14 which respectively cover the joints. In operation, a motion of the double pinion rack bar 12 causes a motion of the tie rods 13 and 13, which in turn allows a steering wheel of a vehicle to be steered by a steering device.

A steering gear box 20 is provided at a right-side end of the rack housing 11. An input shaft 21, which is connected to a steering shaft, to which a steering wheel is integrally attached, via a joint, is supported by the steering gear box such that the input shaft is able to pivot by means of a bearing. The input shaft 21 is provided with a steering pinion (not shown).

The steering pinion is geared with a rack-toothed part (a first toothed part) 12a of the double pinion rack bar 12. The steering force transmitted to the input shaft 21 according to the turning manipulation of the steering wheel rotates the steering pinion having a diagonally toothed part engaged with the toothed part 12a, allowing the double pinion rack bar 12 to be slidably moved in a transverse axial direction.

An auxiliary gear box 30 is provided on a left-side end of the rack housing 11. The auxiliary gear box 30 includes a pinion cylinder part 31, which extends in a slightly tilted vertical direction with respect to the rack housing 11, and a rack guide cylinder part 32 extending perpendicular to the vertical direction.

An auxiliary pinion (not shown) is accommodated in the pinion cylinder part 31 such that the auxiliary pinion is geared with a rack-toothed part (a second toothed part) 12b of the double pinion rack bar 12. A motor 33 is attached to the auxiliary gear box 30, such that a driving shaft of the motor 33 rotates the auxiliary pinion having a diagonally toothed part meshed with the rack-toothed part 12b of the double pinion rack bar 12, allowing the double pinion rack bar 12 to be slidably moved in a transverse axial direction.

The motor 33 is controlled depending upon steering torque of the steering wheel detected through the input shaft 21. The steering action is performed in such a manner that an input steering force is transmitted to the double pinion rack bar 12 via the steering pinion, and the driving force of the motor 33 to be controlled by the steering torque is applied to the same double pinion rack bar 12 via the auxiliary pinion, thereby performing steering action while supporting the input.

FIG. 2 is a plan view showing the double rack bar 12. The double rack bar 12 has first and second toothed parts 12a and 12b, which respectively have angular positions (phases) with respect to an axis of the double pinion rack bar, which are different from each other by approximately 0 to 90 degrees.

In addition, the double pinion rack bar 12 consists of a first rack bar 12A which is formed with a hollow shaft and has the first toothed part 12a, a second rack bar 12B which is formed with a hollow shaft and has the second toothed part 12b, and a joint member 15, wherein the first and second rack bars and the joint member are coupled together with respective axial center lines aligned with each other.

The joint member 15 includes a cylindrical joint body 15a and opposite planar parts (engaging parts) 15b on opposite sides thereon. The planar parts 15b form so called two-way taking engaging parts. In FIG. 2, reference signs 15c and 15d respectively indicate one-side end and another-side end, which are provided for the connection with friction pressure welding surfaces Qa and Qb which will be described later. In addition, the joint body 15a may have a cylindrical shape.

The joint member 15 may be composed of the same material as the first and second rack bars 12A and 12B or other metal material which is suitable for friction pressure welding working. Specifically, S34C carbon steel or the like, which has been widely used as an industrial material, may be proper because the steel is cost-effective, is easily available, is easily cut-processed, and has a proper strength.

Figure 4:
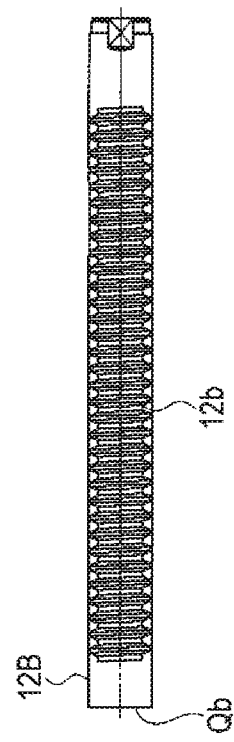
FIG. 4 is a view showing a procedure of manufacturing the double-pinion rack bar.
Figure 4:
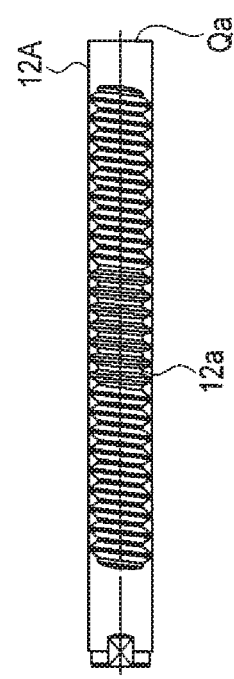

The double pinion rack par 12 having the above-mentioned construction is fabricated in the following manner. As shown in FIG. 4, first and second rack bars 12A and 12B on which the rack toothed parts 12a and 12b are respectively previously formed are prepared. In FIG. 4, reference signs Qa and Qb indicate friction pressure welding surfaces for a joint member 15. Here, before the friction pressure welding, the first and second toothed parts 12a and 12b of the first and second rack bars 12A and 12B, and the friction pressure welding surfaces Qa and Qb are cut to have the squareness, so that the straightness of the entire rack bar after friction pressure welding can be secured in high precision degree.

Figure 5:
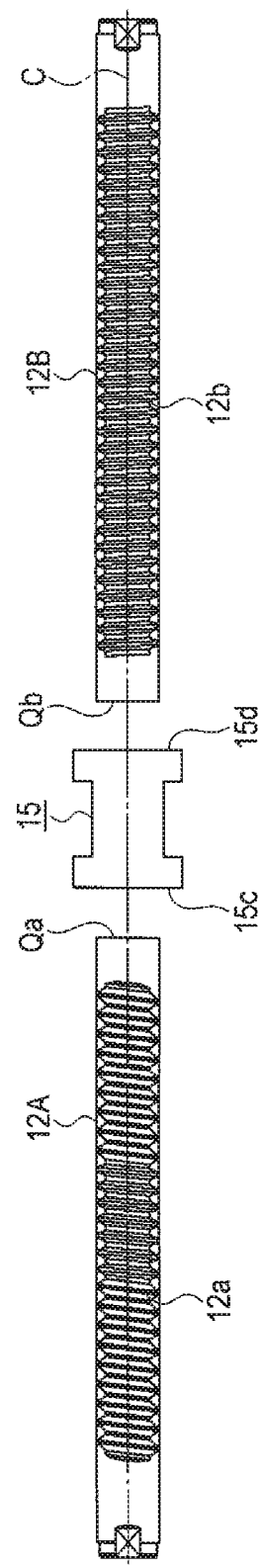
FIG. 5 is a view showing a procedure of manufacturing the double-pinion rack bar.

Next, as shown in FIG. 5, a joint member 15 is arranged between the first and second rack bars 12A and 12B with its axial center line aligned with those of the first and second rack bars 12A and 12B. Meanwhile, opposite-side surfaces 15c and 15d of the joint member 15 maintain high-leveled parallelization.

Figure 6:
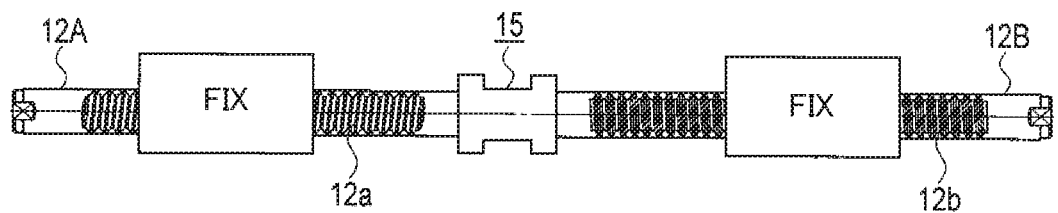
FIG. 6 is a view showing a procedure of manufacturing the double-pinion rack bar.

Next, as shown in FIG. 6, the first and second rack bars 12A and 12B are fixed such that the rack bars are not rotated about the axial center line.

Figure 7:
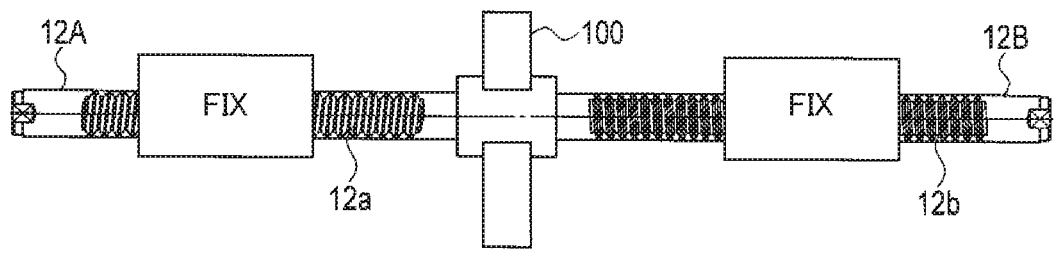
FIG. 7 is a view showing a procedure of manufacturing the double-pinion rack bar.
Figure 8:
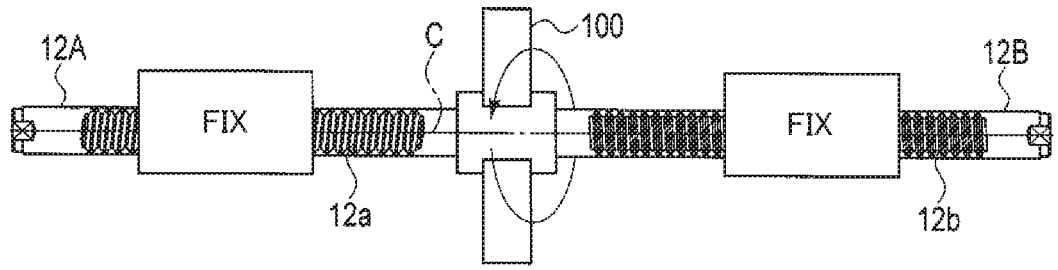
FIG. 8 is a view showing a procedure of manufacturing the double-pinion rack bar.
Figure 9:
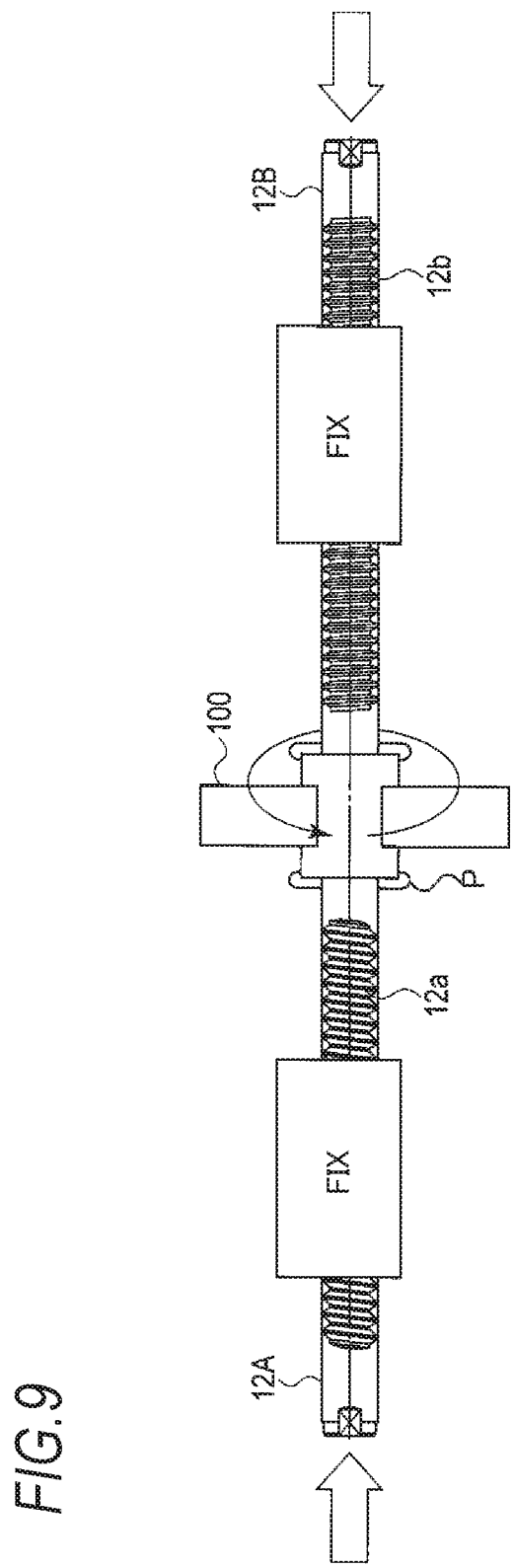
FIG. 9 is a view showing a procedure of manufacturing the double-pinion rack bar.

Next, as shown in FIG. 7, the planar parts 15b of the joint member 15 are engaged with a jig 100. Then, as shown in FIG. 8, the jig 100 is rotated about the axial center line. Then, as shown in FIG. 9, the first rack bar 12A is axially pressed against one-side surface of the joint member 15 and at the same time, the second rack bar 12B are axially pressed against the other-side surface of the joint member 1. Reference sign P in FIG. 9 indicates a joint part.

Accordingly, friction heat is generated to cause a metal structure to change, and pressure is applied as well, so that the first rack bar 12A and the second rack bar 12B are respectively bonded to the joint member 15.

Figure 10:
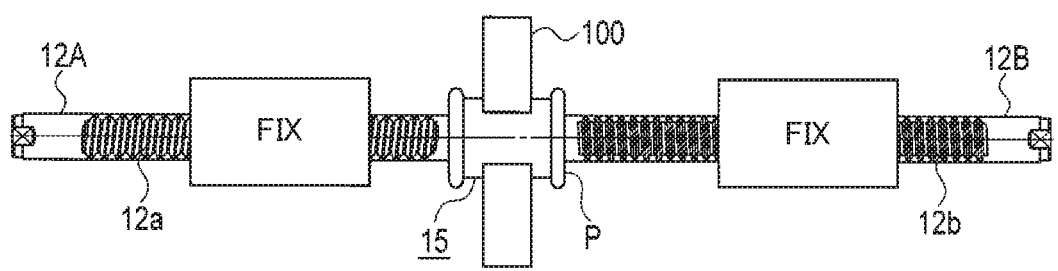
FIG. 10 is a view showing a procedure of manufacturing the double-pinion rack bar.
Figure 11:
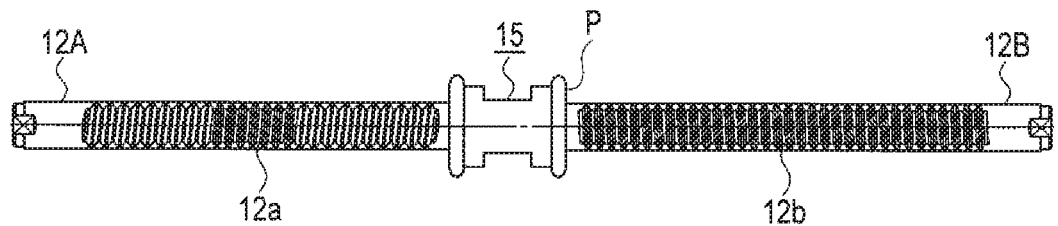
FIG. 11 is a view showing a procedure of manufacturing the double-pinion rack bar.

Further, as shown in FIG. 10, the rotation of the jig 100 is stopped. Here, a phase difference with respect to axial center line between the first and second rack bars 12A and 12B is set to a predetermined value. In the meantime, the degree of precision in determining a phase is about ±0.1°, which does not cause a problem in practical use Next, as shown in FIG. 11, the first rack bar 12A and the second rack bar 12B are decoupled from each other, thereby forming a double pinion rack bar 12.

In the method of fabricating the double pinion rack bar, two rack bars can be fabricated in a conventional working manner. Further, since the two rack bars are simultaneously coupled at both surfaces in a friction pressure welding manner using the joint member 15, it is possible to secure peripheral position-precision, and coaxiality/straightness of the rack toothed parts 12a and 12b at two sites in high precision. Accordingly, a double pinion rack bar adaptable to an electric power steering device can be obtained.

In addition, since it is possible to use a hollow shaft member, in a case of 26 mm diameter member, the hollow shaft member can be reduced in weight by about 40% to 50% compared to a solid shaft member.

Meanwhile, the joint member 15 may be cut to have an outer diameter to suit an outer diameter of the first and second rack bars 12A and 12B.

Figure 12:
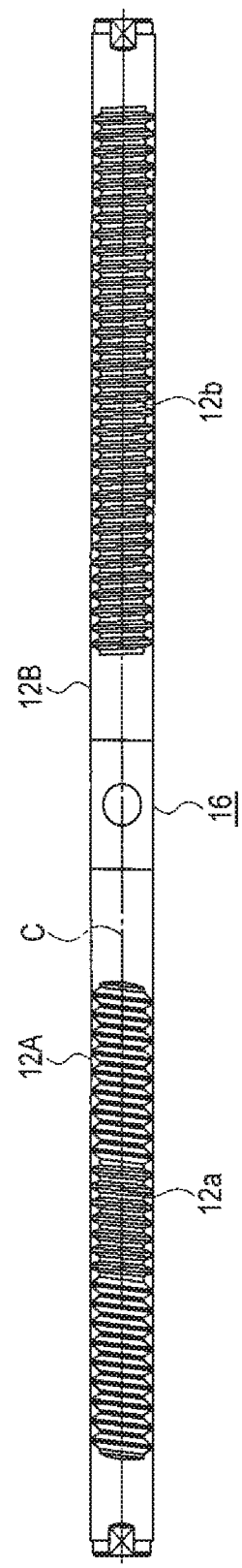
FIG. 12 is a plan view showing a double-pinion rack bar using a joint member according to a modified embodiment of the present invention.
Figure 13:
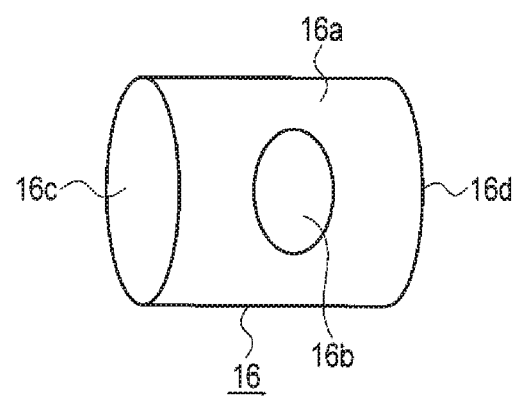
FIG. 13 is a perspective view showing the joint member.

FIG. 12 is a plan view showing a double pinion rack bar 12 using a joint member 16 modified from the above embodiment. FIG. 13 is a perspective view showing the joint member 16. In FIG. 12, the same functional parts as in FIGS. 1 and 2 are assigned as the same reference signs as in FIG. 3, and a detailed description thereof will be omitted.

The joint member 15 is formed into a cylindrical shape which is provided with a central through-hole (engaging hole) 16b. A jig 100 is engaged with the through-hole 16b. In addition, reference signs 16c and 16d in FIG. 13 indicate opposite-side ends for the engagement with the friction pressure welding surfaces Qa and Qb, respectively.

The case using the modified joint member 16 may also have the same effects as the case of fabricating the double pinion rack bar 12 using the above-mentioned joint member 15.

In the meantime, although the present embodiment illustrates that the rack bar having the hollow shaft and the rack bar having the hollow shaft are engaged together, it is possible to accomplish other combination such as a rack bar having a solid shaft and a rack bar having a solid shaft, or a rack bar having a hollow shaft and a rack bar having a solid shaft, which can be arranged opposite the combination of a rack bar having a hollow shaft and a rack bar having a solid shaft. Thus, hollow or solid shafts can be selected and bonded together depending upon a desired function, so the degree of freedom in designing the double pinion rack bar can be increased.

Further, since the rack bar disposed on either steering-side or assist-side side is subjected to a cold sequential forming suitable for forming a complex shaped toothed part such as VGR or the like while forming a toothed part having a shape in which a sufficient tooth width or tooth height is simply required, a shape such as CGR or the like may be set to have a combination of tooth shapes capable of implementing desired performance.

Figure 14:
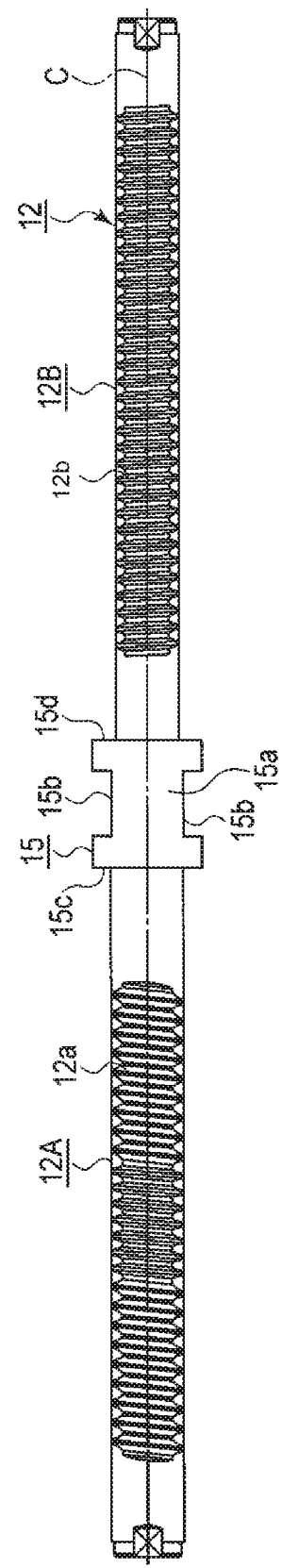
FIG. 14 is a view showing a procedure of manufacturing the double-pinion rack bar with first and second rack bars having different outer diameters.

Furthermore, as shown in FIG. 14, the first and second rack bars 12A and 12B may have different outer diameters.

Of course, the present invention is not limited to the above-mentioned embodiment, but may be modified into a variety of forms without departing from the scope of the present invention.

The invention claimed is:

1. A method of fabricating a rack, the method comprising:
supporting a first rack bar having a first toothed part on a shaft of the first rack bar;
supporting a second rack bar having a second toothed part on a shaft of the second rack bar such that an axial center line of the second rack bar coincides with an axial center line of the first rack bar;
supporting a joint member between the first and second rack bars such that an axial center line of the joint member coincides with the axial center lines of the first and second rack bars, the joint member including a cylindrical joint body and a pair of planar parts extending inwardly from circumferentially opposite sides of the joint member;
rotating the joint member about the axial center lines of the first and second rack bars relative to the first and second rack bars; and
simultaneously bringing an end of the first rack bar and an end of the second rack bar into friction pressure welding with the joint member.

2. The method according to claim 1, wherein a rotation of the joint member is performed by a jig for providing a rotating force and an engaging part provided for engagement with the jig so as to prevent a sliding motion of the joint member about the axial center line of the joint member.

3. The method according to claim 2, wherein:
the engaging part has concave portions, and the planar parts are parts of the concave portions, respectively; and
the friction pressure welding is performed such that the rotating force is transmitted to the joint member via the engaging part having the concave portions, by providing the rotation force to the jig.

4. The method according to claim 1, wherein the joint member is solid.

5. A method of fabricating a rack, the method comprising:
supporting a first rack bar having a first toothed part on a shaft of the first rack bar;
supporting a second rack bar having a second toothed part on a shaft of the second rack bar such that an axial center line of the second rack bar coincides with an axial center line of the first rack bar;
supporting a joint member between the first and second rack bars such that an axial center line of the joint member coincides with the axial center lines of the first and second rack bars, the joint member including a cylindrical joint body and a through hole penetrating the cylindrical joint body in a direction perpendicular to the axial center line of the joint member;
rotating the joint member about the axial center lines of the first and second rack bars relative to the first and second rack bars; and
simultaneously bringing an end of the first rack bar and an end of the second rack bar into friction pressure welding with the joint member.

6. The method according to claim 5, wherein a rotation of the joint member is performed by a jig for providing a rotating force and an engaging part provided for engagement with the jig so as to prevent a sliding motion of the joint member about the axial center line of the joint member.

7. The method according to claim 6, wherein:
the through hole is the engaging part; and
the friction pressure welding is performed such that the rotating force is transmitted to the joint member via the engaging part being the through hole, by providing the rotation force to the jig.

8. The method according to claim 5, wherein the joint member is solid.

* * * * *